(12) United States Patent
Huang

(10) Patent No.: US 11,607,736 B2
(45) Date of Patent: Mar. 21, 2023

(54) DRILLING DEVICE

(71) Applicant: VERO VERIA CORPORATION, New Taipei (TW)

(72) Inventor: Chien-Teh Huang, New Taipei (TW)

(73) Assignee: VERO VERIA CORPORATION, New Taipei (TW)

( * ) Notice: Subject to any disclaimer, the term of this patent is extended or adjusted under 35 U.S.C. 154(b) by 53 days.

(21) Appl. No.: 17/163,608

(22) Filed: Feb. 1, 2021

(65) Prior Publication Data

US 2022/0080512 A1    Mar. 17, 2022

(30) Foreign Application Priority Data

Sep. 15, 2020 (TW) .................. 109131677

(51) Int. Cl.
*B23B 39/16* (2006.01)

(52) U.S. Cl.
CPC ........ *B23B 39/162* (2013.01); *B23B 2250/12* (2013.01)

(58) Field of Classification Search
CPC ... B23B 39/162; B23B 39/16; B23B 2250/12; B23Q 11/128; B23Q 11/141
See application file for complete search history.

(56) References Cited

U.S. PATENT DOCUMENTS

| | | | | |
|---|---|---|---|---|
| 2,108,297 A | * | 2/1938 | Schafer | B23B 39/162 74/665 R |
| 2,430,127 A | * | 11/1947 | Kronenberg | B23Q 11/141 62/DIG. 10 |
| 2,608,112 A | * | 8/1952 | Speckin | B23B 39/162 74/665 R |
| 4,867,618 A | * | 9/1989 | Brohammer | B23B 39/162 409/231 |

FOREIGN PATENT DOCUMENTS

JP       2000308954 A  * 11/2000 ............... B23C 3/30

* cited by examiner

*Primary Examiner* — Boyer D Ashley
*Assistant Examiner* — Reinaldo A Del Vargas Rio
(74) *Attorney, Agent, or Firm* — Amin, Turocy & Watson, LLP

(57) ABSTRACT

A drilling device is provided and has a driving assembly disposed on a base for rotating a plurality of drills. As such, a plurality of drills can be actuated synchronously at a time point to effectively improve the production efficiency and reduce the drilling cost.

13 Claims, 15 Drawing Sheets

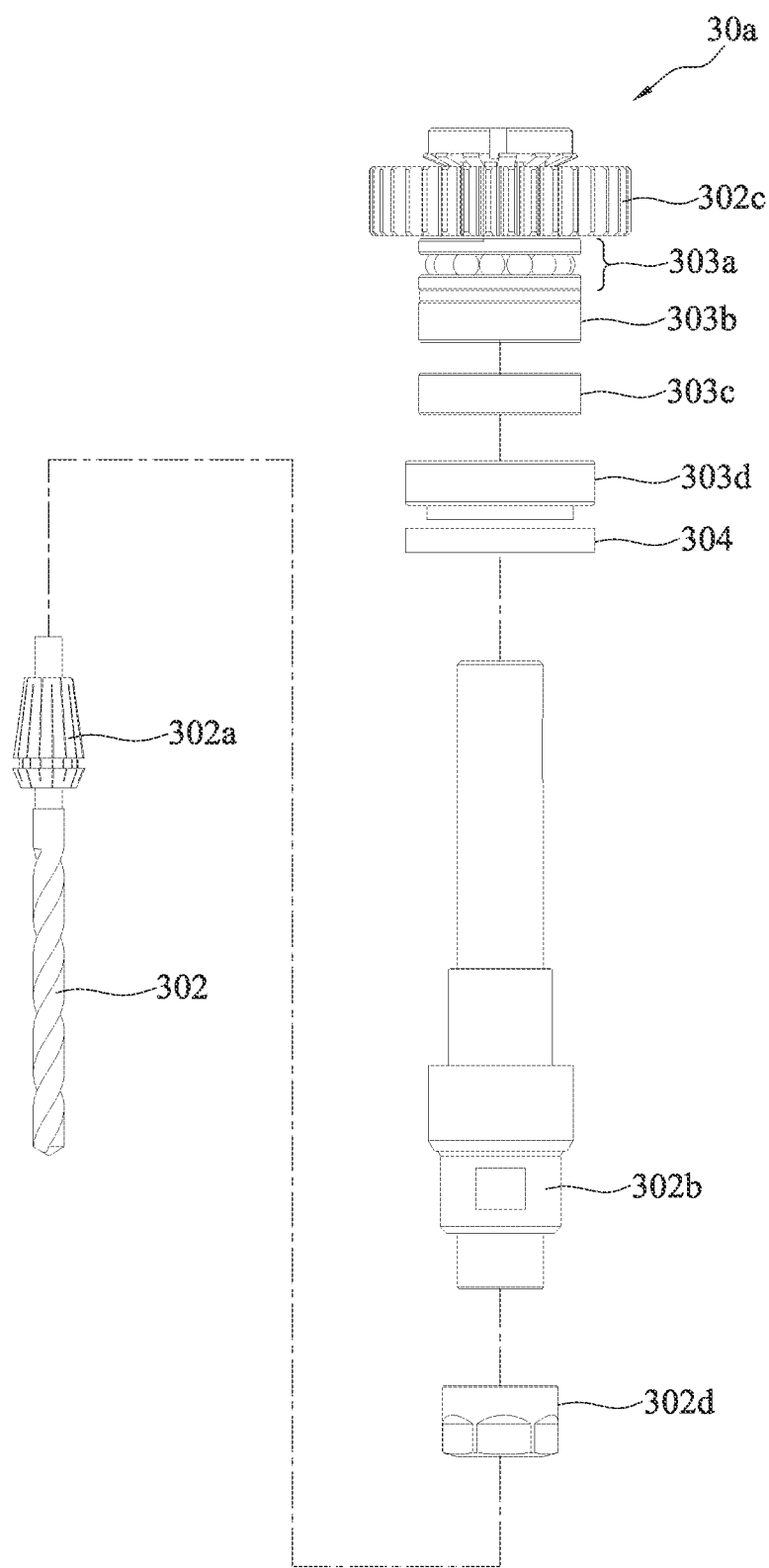
FIG. 4A"

DRILLING DEVICE

CROSS-REFERENCE TO RELATED APPLICATIONS

This application claims priority to Taiwan Application Serial No. 109131677, filed on Sep. 15, 2020. The entirety of the application is hereby incorporated by reference herein and made a part of this application.

BACKGROUND

1. Technical Field

The present disclosure relates to drilling devices, and more particularly, to a drilling device of a multi-axis drilling machine.

2. Description of Related Art

A conventional drilling machine is generally provided with a single drill. Therefore, only a single hole is formed under a single operation.

However, as current production lines are planning cost reduction, since the conventional drilling machine can only perform a drilling operation for a single product at a time point, it cannot meet the requirements of improved production efficiency and reduced production cost.

Therefore, how to overcome the above-described drawbacks of the prior art has become an urgent issue in the art.

SUMMARY

In view of the above-described drawbacks, the present disclosure provides a drilling device, which comprises: a base of a multi-layer structure; a driving assembly disposed on the base; and a drill set disposed on the base and coupled with the driving assembly, wherein the drill set comprises a plurality of drills that are disposed under the base and are driven and rotated by the driving assembly.

In an embodiment, the multi-layer structure comprises a cover plate, a first layer plate, a second layer plate and a bottom plate that are sequentially stacked on one another, and the first layer plate, the second layer plate and the bottom plate are locked together, and the cover plate and the first layer plate are locked with one another. For example, the first layer plate, the second layer plate and/or the bottom plate are formed with a cooling channel, and a side surface of the first layer plate, the second layer plate and/or the bottom plate are formed with a plurality of ports in communication with the cooling channel. Alternatively, the base has a plurality of multi-layer holes penetrating through the first layer plate, the second layer plate and the bottom plate.

In an embodiment, the driving assembly comprises a transmission shaft, a bearing base engaged with the transmission shaft and a driving gear coupled with the transmission shaft for driving the plurality of drills to rotate. For example, the bearing base is an annular sleeve body having a plurality of fastening holes for a plurality of screws to pass therethrough, thereby fastening the bearing base on the base.

In an embodiment, the drill set further comprises a plurality of drill bodies provided with the drills, a plurality of coupling portions cooperating with the driving assembly to actuate portions of the drills, and a plurality of transmission portions for coupling the plurality of drills.

For example, each of the coupling portions comprises a rotating shaft, a first coupling gear and a second coupling gear respectively disposed at two opposite ends of the rotating shaft, and a bearing base is disposed between the first coupling gear and the second coupling gear, and the driving assembly rotates the first coupling gear to cause the rotating shaft to rotate the second coupling gear synchronously. Further, a bearing is disposed at the two opposite ends of the rotating shaft, and the second coupling gears cause portions of the drills to rotate.

For example, the transmission portion comprises an idler gear and a passive shaft with one end thereof being disposed on the idler gear and the other end thereof being configured with a passive bearing, and the idler gears rotate the drills. Further, each of the plurality of idler gears is engaged between any two of the plurality of drills.

For example, each of the drill bodies is a drill structure configured with a main shaft, a chuck engaged with one end of the main shaft, an action gear disposed to the other end of the main shaft, and a plurality of bearings and an oil seal disposed on the main shaft, and the drill is securely connected to the chuck, and the plurality of bearings and the oil seal are positioned between the chuck and the action gear. Further, the drill is securely connected to an end of the chuck, and the action gear is disposed on the other end of the chuck to allow the action gear to rotate the chuck and thereby rotate the drill.

For example, each of the coupling portions comprises a rotating shaft and a coupling gear disposed on the rotating shaft, wherein each of the drill bodies is configured with a main shaft and an action gear disposed on the main shaft, and each of the transmission portions comprises an idler gear and a passive shaft for disposing the idler gear. When the coupling gears of the coupling portions couple portions of the action gears, the other action gears are coupled synchronously by the idler gears that are engaged with the action gears.

According to the drilling device of the present disclosure, a plurality of drills can be actuated synchronously at a time point through a driving assembly. Compared with the prior art, the drilling device of the present disclosure can effectively increase the number of drilling holes on an object so as to improve the production efficiency, and reduce the number of driving devices so as to lower the drilling cost.

BRIEF DESCRIPTION OF THE DRAWINGS

FIG. 4A' is a schematic side plan view of FIG. 4A.

FIG. 4A" is an exploded view of FIG. 4A'.

DETAILED DESCRIPTION

The following illustrative embodiments are provided to illustrate the present disclosure, these and other advantages and effects can be apparent to those in the art after reading this specification.

It should be noted that all the drawings are not intended to limit the present disclosure. Various modifications and variations can be made without departing from the spirit of the present disclosure. Further, terms such as "up," "down," "front," "rear," "left," "right," "eight," "four," "a," etc., are merely for illustrative purposes and should not be construed to limit the scope of the present disclosure.

Figure 1A:
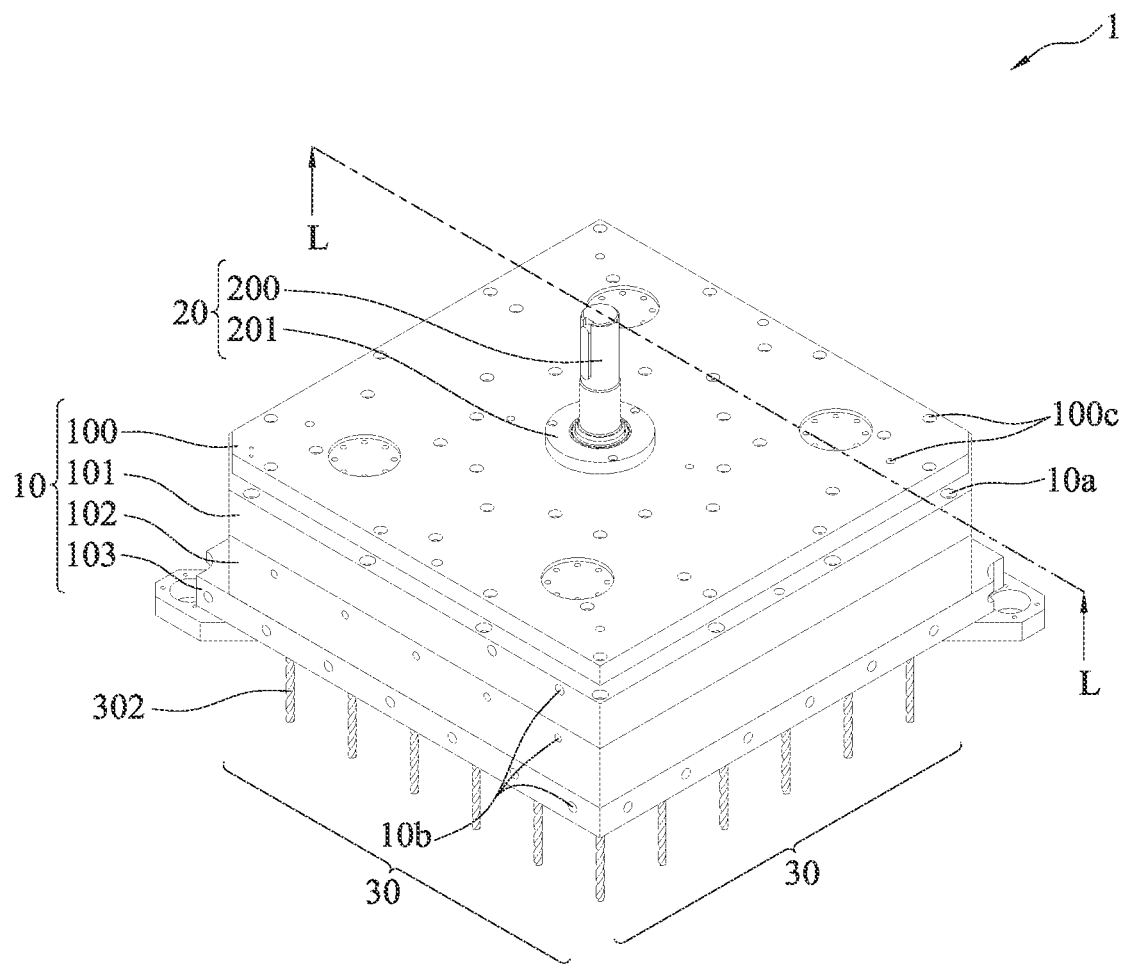
FIG. 1A is a schematic perspective upper view of a drilling device according to the present disclosure.
Figure 1B:
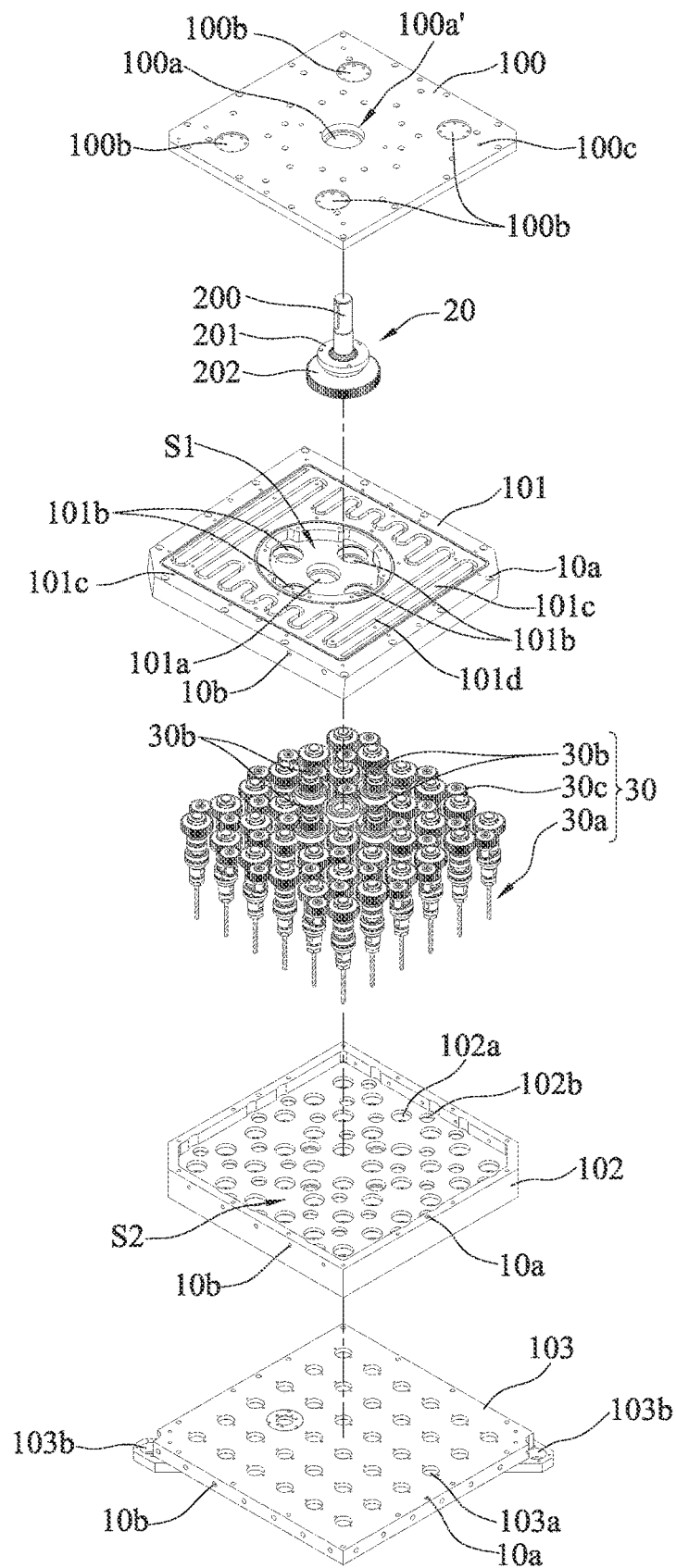
FIG. 1B is a schematic perspective exploded view of FIG. 1A.

FIGS. 1A and 1B are schematic perspective views of a drilling device 1 according to the present disclosure. Referring to FIGS. 1A and 1B, the drilling device 1 is a multi-axis drilling machine, which has a base 10, a driving assembly 20 and a drill set 30.

The base 10 has a multi-layer structure. In an embodiment, the base 10 has a square profile. Alternatively, the base 10 can have a rectangular profile.

In an embodiment, referring to FIG. 1B, the base 10 has: a cover plate 100 having a first through hole 100a and a plurality of connection bases 100b; a first layer plate 101 having a first penetrating hole 101a and a plurality of second penetrating holes 101b; a second layer plate 102 having a plurality of first setting holes 102a and a plurality of second setting holes 102b; and a bottom plate 103 having a plurality of second through holes 103a and a plurality of mounting holes 103b. Therein, the first layer plate 101 is formed with a first groove portion S1 for arranging the first penetrating hole 101a and the plurality of second penetrating holes 101b. The second layer plate 102 is formed with a second groove portion S2 of a rectangular shape for arranging the plurality of first setting holes 102a and the plurality of second setting holes 102b. For example, the first through hole 100a corresponds to and communicates with the first penetrating hole 101a, the first penetrating hole 101a is positioned at a center of the first groove portion S1, the plurality of (for example, four) second penetrating holes 101b are arranged along an edge of the first groove portion S1 and around the first penetrating hole 101a, the first setting holes 102a are greater in diameter than the second setting holes 102b, and the plurality of second through holes 103a correspond to and communicate with the plurality of first setting holes 102a.

Further, the first groove portion S1 of the first layer plate 101 is a circular groove, and a bottom of the first groove portion S1 is penetrated to form the first penetrating hole 101a and the plurality of second penetrating holes 101b. The second groove portion S2 of the second layer plate 102 is of a rectangular shape, and a bottom of the second groove portion S2 is penetrated to form the first setting holes 102a and the second setting holes 102b. A cooling channel 101d (cooling oil channel or cooling water channel) of a serpentine shape is formed on the first layer plate 101. A plurality of screws (not shown) are provided to lock a plurality of screw holes 101c of the first layer plate 101 (including larger outer holes and smaller inner holes) with a plurality of screw holes 100c of the cover plate 100 (including larger outermost holes and smaller inner holes). It should be understood that the cooling channel 101d can further be arranged in the second layer plate 102 and the bottom plate 103, and a plurality of ports 10b in communication with the cooling channel 101d can be formed on a side surface of the first layer plate 101, the second layer plate 102 and the bottom plate 103 for delivering a coolant to the cooling channel 101d.

Further, the base 10 is formed by sequentially stacking the cover plate 100, the first layer plate 101, the second layer plate 102 and the bottom plate 103 from top to bottom. For example, the first layer plate 101, the second layer plate 102 and the bottom plate 103 are locked together by screws (not shown) that pass through a plurality of multi-layer holes 10a penetrating through the first layer plate 101, the second layer plate 102 and the bottom plate 103. The cover plate 100 and the first layer plate 101 are locked together by screws (not shown) that pass through the plurality of screw holes 100c, 101c of the cover plate 100 and the first layer plate 101.

Further, the connection bases 100b are used for externally connecting with another device such as a driving device (for example, a motor) so as to drive the drilling device 1 to perform a drilling operation (e.g., up or down drilling operation). The mounting holes 103b are used for mounting the drilling device 1 to where the drilling device 1 is needed, for example, on a machine of a production line.

Figure 2A:
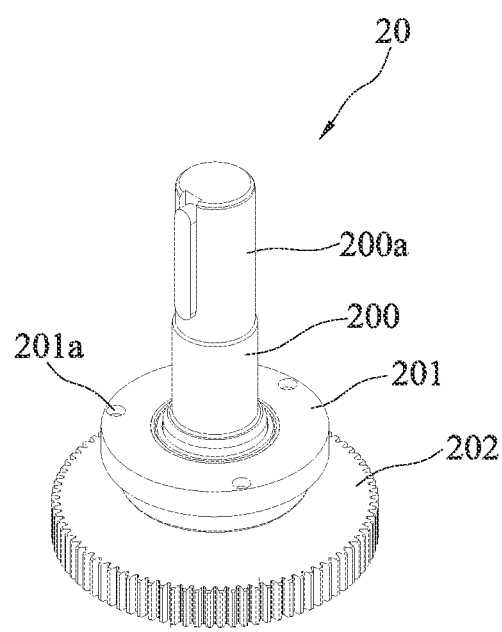
FIG. 2A is a schematic perspective view of a driving assembly of the drilling device according to the present disclosure.
Figure 2B:
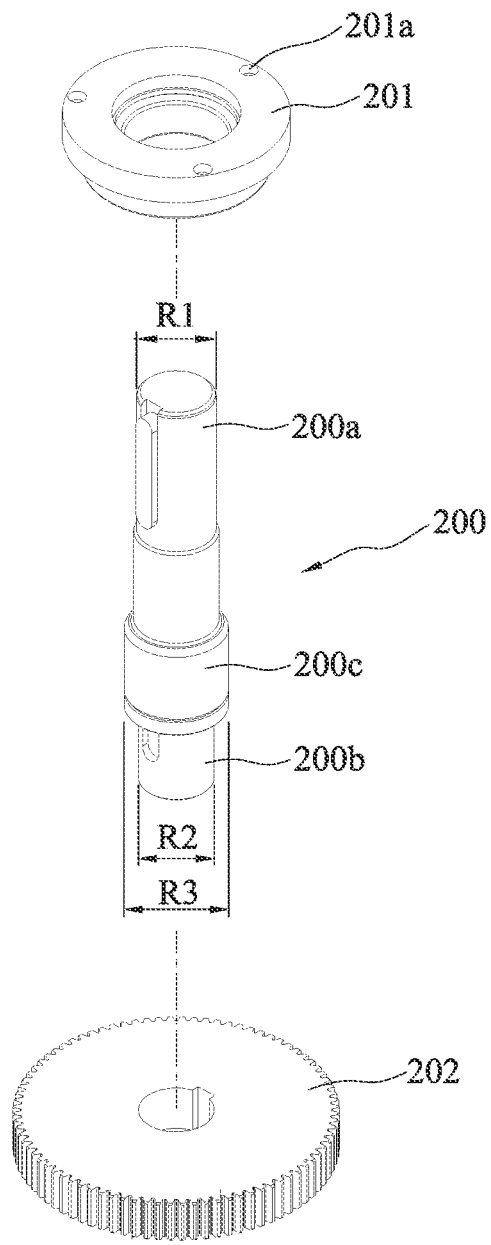
FIG. 2B is a schematic perspective exploded view of FIG. 2A.

The driving assembly 20 has a transmission shaft 200, a bearing base 201 engaged with the transmission shaft 200 and a driving gear 202 coupled with the transmission shaft 200, as shown in FIGS. 2A and 2B.

In an embodiment, the transmission shaft 200 is axially connected to a driving device (for example, a motor). The transmission shaft 200, which is substantially of a multi-section round rod shape, has a first section 200a and a second section 200b defined at opposite ends thereof, and a position limiting section 200c is formed between the first section 200a and the second section 200b and adjacent to the second section 200b. For example, the width (or diameter) R3 of the position limiting section 200c is greater than the width (or diameter) R1 of the first section 200a and the width (or diameter) R2 of the second section 200b.

Further, the bearing base 201 is an annular sleeve body and has a bearing (not shown) disposed inside thereof and a plurality of (for example, three) fastening holes 201a formed on a periphery thereof. A plurality of screws (not shown) are passed through the fastening holes 201a of the bearing base 201 and fastening holes 100a' of the cover plate 100 (which are positioned around the first through hole 100a) for fastening the bearing base 201 on the cover plate 100. The bearing base 201 is sleeved on the transmission shaft 200 from the first section 200a of the transmission shaft 200 and positioned on the position limiting section 200c, and the transmission shaft 200 is disposed at the first through hole 100a of the cover plate 100 through the bearing base 201, as shown in FIGS. 1A, 2A and 2B.

Further, the driving gear 202 is axially connected to the second section 200b of the transmission shaft 200 and prevented by the position limiting section 200c from moving toward the first section 200a. The driving gear 202 is positioned below the cover plate 100. It should be understood that the driving gear 202 is positioned in the first groove portion S1 of the first cover plate 101 of the base 10, and the second penetrating holes 101b are positioned at an outer periphery of the driving gear 202.

Furthermore, the end of the transmission shaft 200 is axially connected to the first penetrating hole 101a, and the first section 200a of the transmission shaft 200 protrudes from the cover plate 100 and is axially connected to the driving device (for example, a motor).

The drill set 30 has a plurality of (for example, 36 of FIG. 1B) drill bodies 30a, a plurality of (for example, four) coupling portions 30b cooperating with the driving assembly 20 to actuate portions of the drill bodies 30a, and a plurality of transmission portions 30c coupling the drill bodies 30a.

Figure 1C:
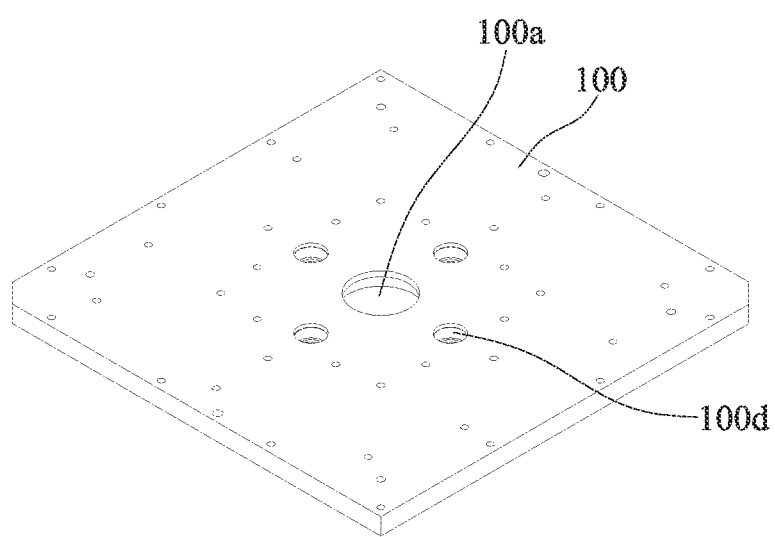
FIG. 1C is a schematic partial perspective lower view of FIG. 1B.
Figure 3A:
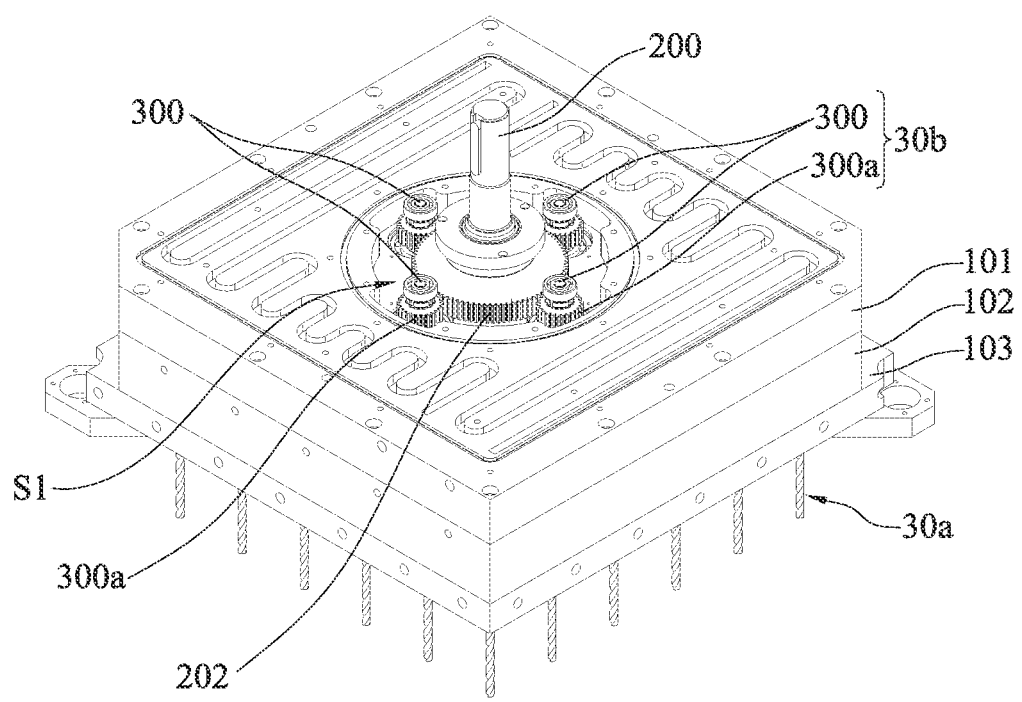
FIG. 3A is a schematic partial perspective view of the drilling device according to the present disclosure.
Figure 3B:
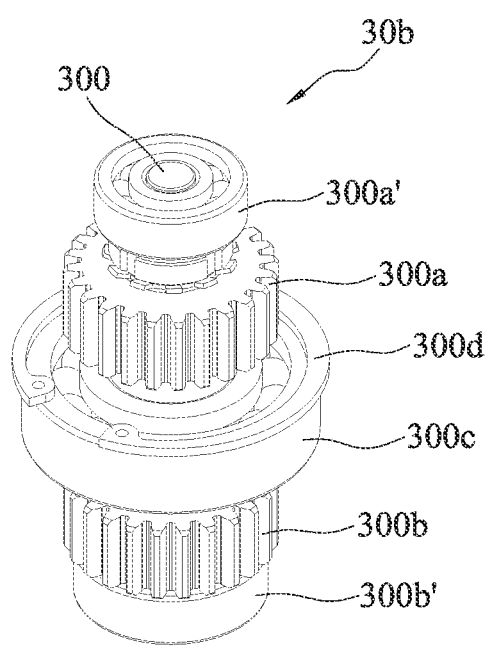
FIG. 3B is a schematic perspective view of a coupling portion of a drill set of the drilling device according to the present disclosure.

Referring to FIGS. 3A and 3B, each of the coupling portions 30b has a rotating shaft 300 penetrating through the second penetrating hole 101b of the first layer plate 101. Bearings 300a', 300b' are disposed at two opposite ends of the rotating shaft 300. The bearing 300a' is disposed in a recessed hole 100d of the bottom of the cover plate 100 corresponding to the second penetrating hole 101b (as shown in FIG. 1C). The recessed hole 100d is a step-like blind hole for receiving the bearing 300a'. The bearing 300b' is positioned in the first layer plate 101 corresponding to the second penetrating hole 101b (as shown in FIG. 3A). A first coupling gear 300a and a second coupling gear 300b are respectively disposed at two opposite ends of the rotating shaft 300, and a bearing base 300c is disposed between the first coupling gear 300a and the second coupling gear 300b, as shown in FIG. 3B.

In an embodiment, the bearing base 300c is fastened in the second penetrating hole 101b through a C-shaped retaining ring 300d, thus allowing the first coupling gear 300a to be positioned in the first groove portion S1 of the first layer plate 101 and the second coupling gear 300b to be positioned in the second groove portion S2 of the second layer plate 102.

Figure 3C:
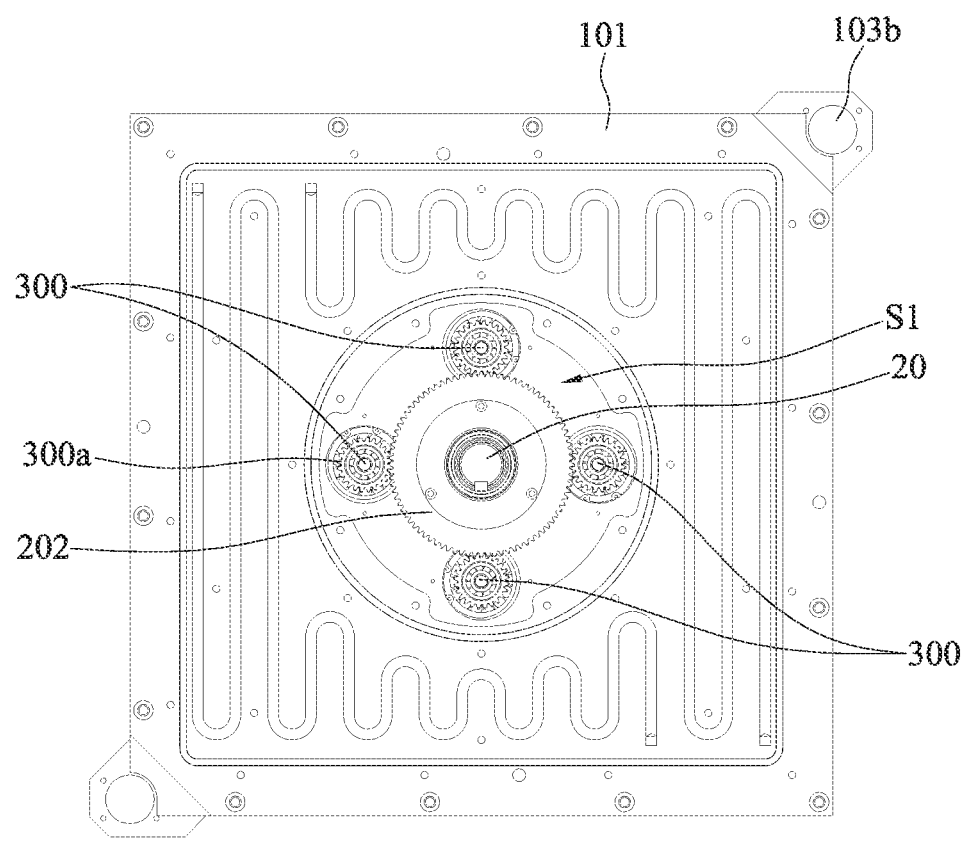
FIG. 3C is a schematic upper plan view of FIG. 3A.

Further, the first coupling gear 300a is engaged with the driving gear 202, as shown in FIGS. 3A and 3C. Therefore, when the transmission shaft 200 of the driving assembly 20 rotates, the driving gear 202 rotates synchronously with the first coupling gear 300a, thereby causing the rotating shaft 300 to rotate. For example, the four first coupling gears 300a are engage with the driving gear 202, respectively.

Figure 4A:
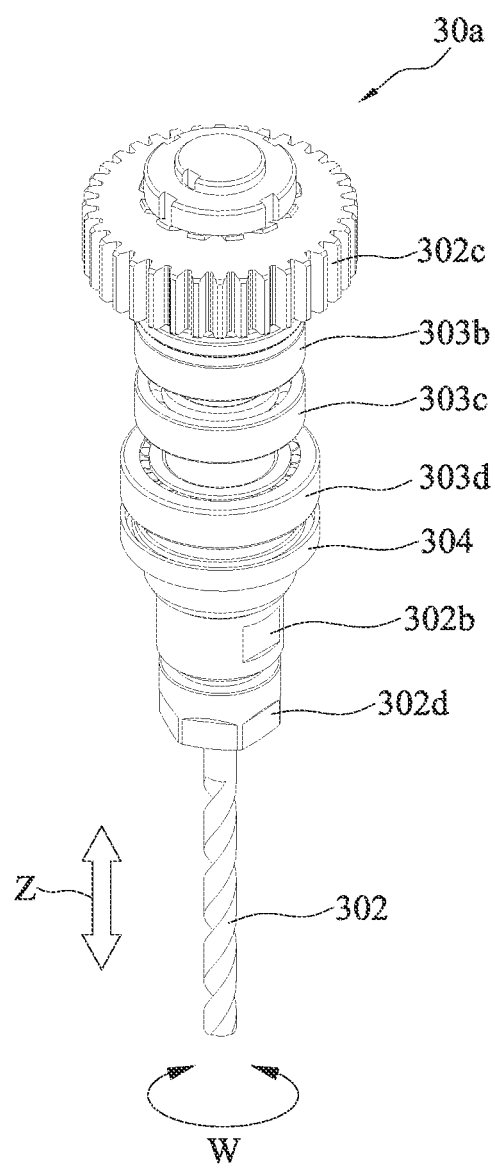
FIG. 4A is a schematic perspective view of a drill body of the drill set of the drilling device according to the present disclosure.
Figure 4A:
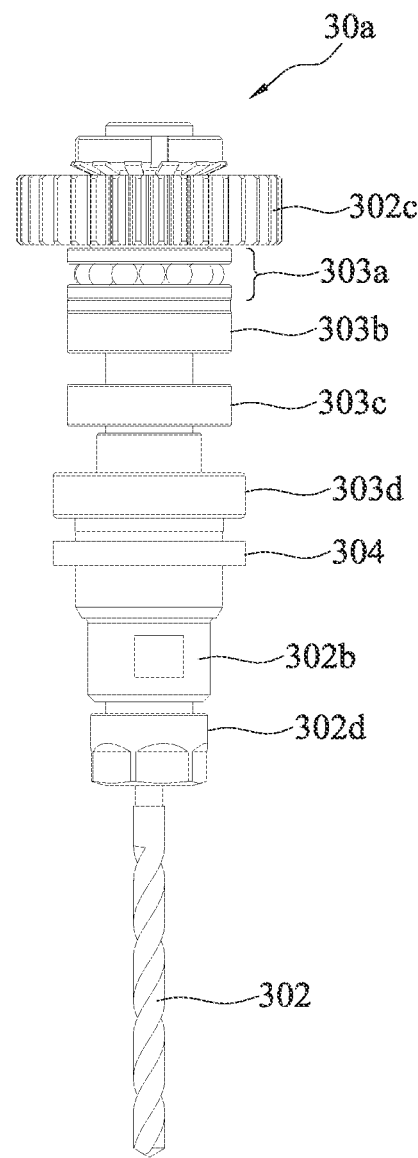

The drill bodies 30a have a drill structure. As shown in FIGS. 4A, 4A', 4A" and 6, 36 drill bodies are arranged in an array in the rectangular base 10. Each of the drill bodies has a main shaft 302b, a chuck 302a engaged with one end of the main shaft 302b, a drill 302 fastened to a lower end of the chuck 302a, an action gear 302c disposed at the other end of the main shaft 302b, and first to fourth bearings 303a, 303b, 303c, 303d and an oil seal 304 sleeved on the main shaft 302b and between the chuck 302a and the action gear 302c.

Figure 4B:
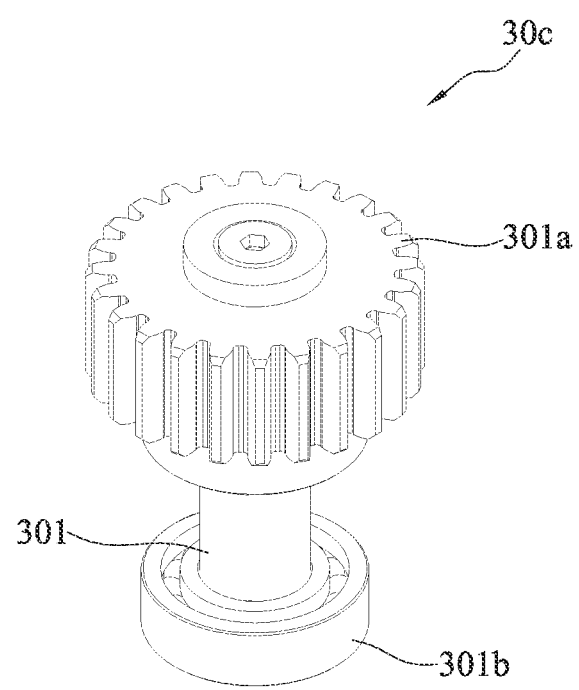
FIG. 4B is a schematic perspective view of a transmission portion of the drill set of the drilling device according to the present disclosure.
Figure 4C:
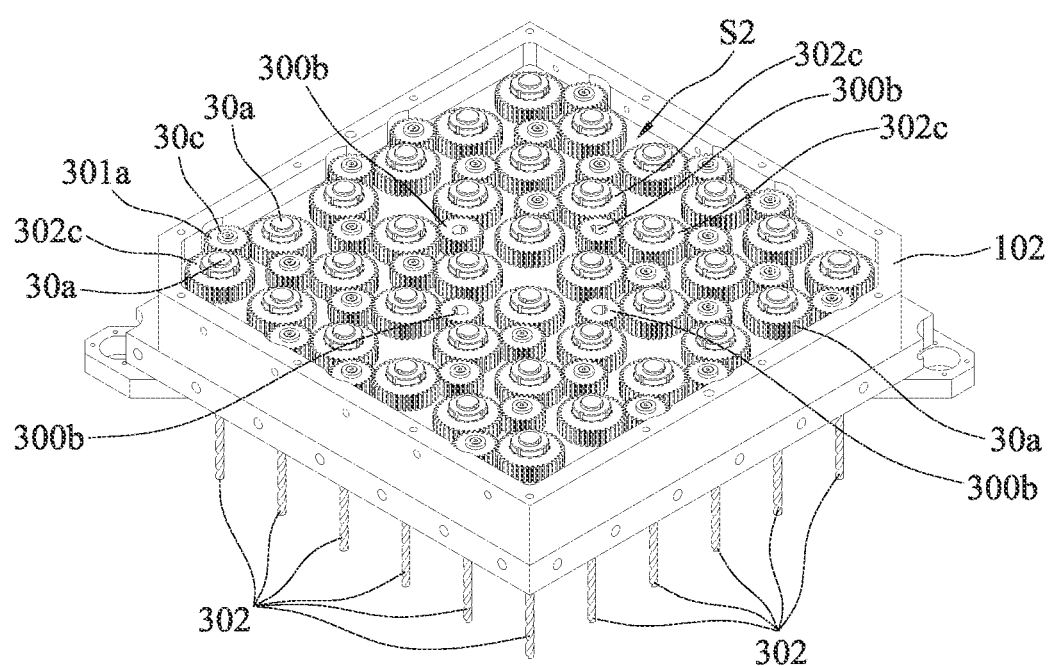
FIG. 4C is a schematic partial perspective view of the drilling device according to the present disclosure.

In an embodiment, the chuck 302a passes through the first setting hole 102a of the second layer plate 102 and the second through hole 103a of the bottom plate 103, the drill 302 protrudes from the second through hole 103a so as to be exposed from the base 10, and the action gear 302c is positioned in the second groove portion S2 of the second layer plate 102, as shown in FIGS. 1B and 4C. It should be understood that the upper end of the chuck 302a is configured with the main shaft 302b and the first to fourth bearings 303a, 303b, 303c, 303d and the oil seal 304 disposed on the main shaft 302b. As such, when the main shaft 302b is actuated by the action gear 302c to rotate (in a rotation direction W of FIG. 4A) and the drilling device 1 moves linearly up or down (in a linear direction Z of FIG. 4A), the drill 302 generates a drilling effect.

Further, the chuck 302a is partially inserted into the main shaft 302b, and a cap 302d covers the exposed portion of the chuck 302a.

Furthermore, each of the second coupling gears 300b of the coupling portions 30b is engaged between two of the action gears 302c. Therefore, a total of eight actions gears 302c are engaged with four second coupling gears 300b, as shown in FIG. 4C. It should be understood that since FIG. 4C is used to illustrate the engagement between the second coupling gears 300b and the action gears 302c, the other elements connected to the second coupling gears 300b as shown in FIG. 3B are omitted in FIG. 4C.

In addition, through the design of the first setting holes 102a, the distance between each of the drills 302 is fixed to facilitate synchronous drilling on a plurality of identical products while maintaining the drilling precision of each of the products. Also, a plurality of holes can be formed on a single product while maintaining the precision of each hole of the product.

The transmission portions 30c are used to couple the action gears 302c of the drill bodies 30a and each has an idler gear 301a and a passive shaft 301 for disposing the idler gear 301a, as shown in FIG. 4B.

In an embodiment, the passive shaft 301 has a column shape. The idler gear 301a is disposed on one end of the passive shaft 301 and a passive bearing 301b is disposed on the other end of the passive shaft 301. For example, the passive bearing 301b is fastened on the second setting hole 102b of the second groove portion S2 of the second layer plate 102. As such, the transmission portions 30c on the second layer plate 102 are disposed between the drill bodies 30a and the idler gears 301a are engaged with the action gears 302c, as shown in FIGS. 4B and 4C. Therefore, when the four second coupling gears 300b of the coupling portions 30b couple the eight action gears 302c, the other 28 action gears 302c are coupled synchronously by the idler gears 301a of the transmission portions 30c that are engaged with the action gears 302c.

Further, the action gears 302c are greater in diameter than the idler gears 301a and the second coupling gears 300b.

Figure 5:
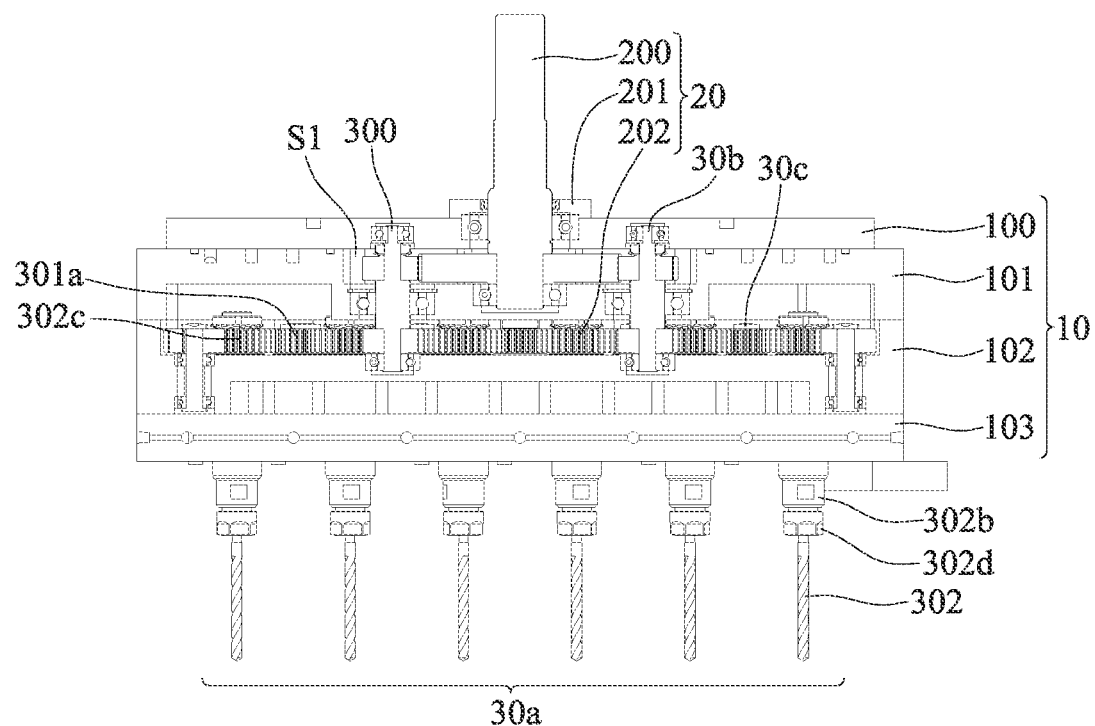
FIG. 5 is a schematic cross-sectional view taken along a line L-L of FIG. 1A.
Figure 6:
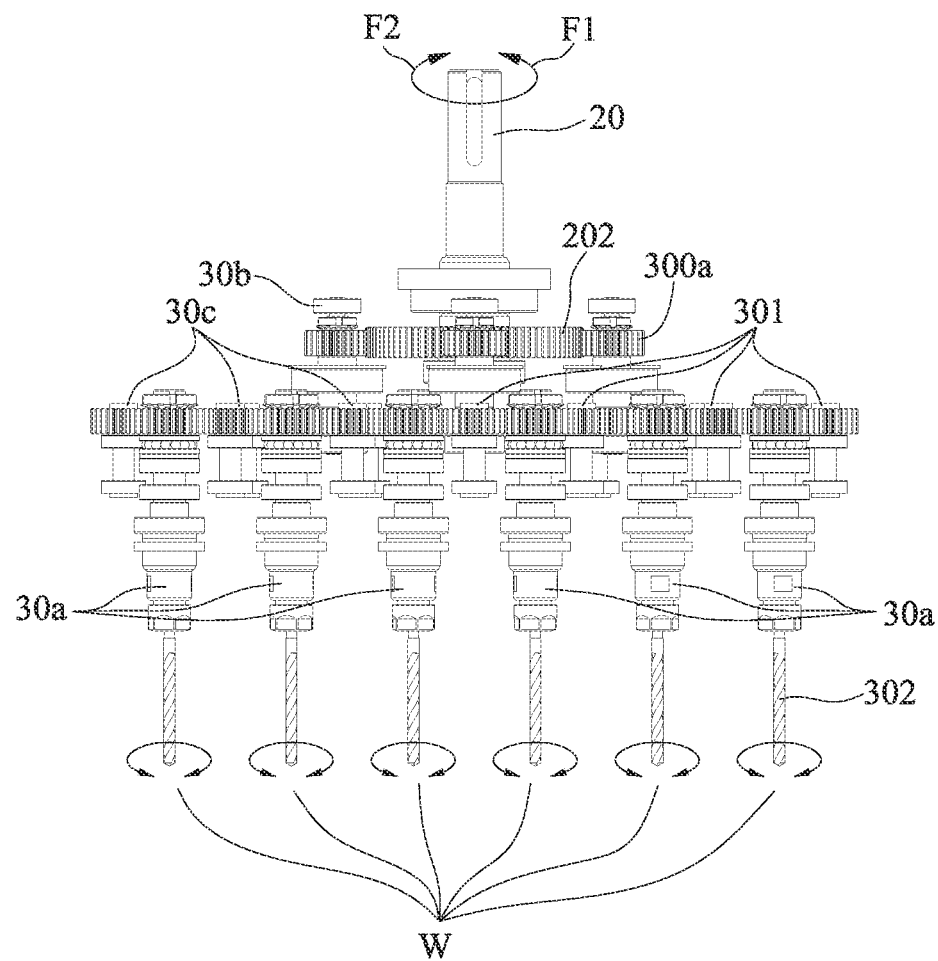
FIG. 6 is a schematic partial side view of the drilling device according to the present disclosure.

FIGS. 5 and 6 are schematic views of the drilling device 1 according to the present disclosure. Therein, FIG. 5 is a schematic cross-sectional view taken along a line L-L of the drilling device 1 of FIG. 1A.

In use, a driving force is provided (in an action direction F1, F2 of the motor of FIG. 6) to rotate the transmission shaft 200 of the driving assembly 20, thereby rotating the driving gear 202. The driving gear 202 further rotates the first coupling gears 300a of the coupling portions 30b synchronously so as to couple the rotating shafts 300 of the coupling portions 30b to rotate. Thus, the rotating shafts 300 rotate the second coupling gears 300b of the coupling portions 30b, which further rotate the eight action gears 302c of the drill bodies 30a synchronously. At the same time, the other 28 action gears 302c are rotated by the idler gears 301a of the transmission portions 30c that are engaged with the action gears 302c. Further, all of the chucks 302a of the drill bodies 30a rotate the drills 302 of the drill bodies 30a synchronously (in a rotation direction W of FIG. 6) so as to perform a drilling operation on an object (not shown). On the other hand, an external force is provided by, for example, a motor or other driving device so as to drive the drills 302 to move linearly up or down.

According to the drilling device 1 of the present disclosure, a plurality of drills 302 can be actuated synchronously at a time point through a gear set. Compared with the prior art that can only perform a drilling operation with a single drill at a time point, the drilling device 1 of the present disclosure can effectively increase the number of drilling holes on an object so as to improve the production efficiency, fix the distance between each of the drills 302 so as to increase the drilling precision, and reduce the number of driving devices (for example, motors) so as to lower the drilling cost.

The above-described descriptions of the detailed embodiments are to illustrate the preferred implementation according to the present disclosure, and it is not to limit the scope of the present disclosure. Accordingly, all modifications and variations completed by those with ordinary skill in the art should fall within the scope of present disclosure defined by the appended claims.

What is claimed is:

1. A drilling device, comprising:

a base of a multi-layer structure, wherein the multi-layer structure comprises a cover plate, a first layer plate, a second layer plate and a bottom plate sequentially stacked on one another, wherein the first layer plate, the second layer plate and the bottom plate are locked together, and the cover plate and the first layer plate are locked with one another, and wherein at least one of the first layer plate, the second layer plate and the bottom plate are directly formed with a cooling channel of a serpentine shape;

a driving assembly disposed on the base, wherein the driving assembly comprises a transmission shaft and a driving gear directly disposed on and coupled with the transmission shaft; and a drill set disposed on the base and coupled with the driving assembly, wherein the drill set comprises a plurality of drills disposed under the base and driven and rotated by the driving assembly, wherein the drill set further comprises a plurality of drill bodies provided with the drills, a plurality of coupling portions, and a plurality of transmission portions for coupling the plurality of drills, wherein each of the drill bodies is configured with an action gear, wherein each of the coupling portions comprises a rotating shaft, a first coupling gear and a second coupling gear respectively disposed at two opposite ends of the rotating shaft, wherein the second coupling gear is engaged with the action gear, and the driving gear is engaged with the first coupling gear to rotate the first coupling gear to cause the rotating shaft to rotate the second coupling gear synchronously so as to rotate the action gear to actuate the drills, wherein each of the transmission portions comprises an idler gear and a passive shaft with one end thereof being disposed on the idler gear and the other end thereof being configured with a passive bearing, and the idler gear rotates the drills, wherein the second coupling gears, the action gears and the idler gears are as one gear layer, and the driving gear and the first coupling gears are as another gear layer, and a driving force is provided to rotate the transmission shaft to rotate the driving gear, and the driving gear further rotates the first coupling gear synchronously so as to couple the rotating shafts to rotate, such that the rotating shafts rotate the second coupling gears to further rotate the action gears synchronously, and at the same time, the action gears are rotated by the idler gears engaged with the action gears to rotate the drills so as to perform a drilling operation on an object.

2. The drilling device of claim 1, wherein a side surface of at least one of the first layer plate, the second layer plate and the bottom plate are formed with a plurality of ports in communication with the cooling channel.

3. The drilling device of claim 1, wherein the base has a plurality of multi-layer type holes penetrating through the first layer plate, the second layer plate and the bottom plate.

4. The drilling device of claim 1, wherein the driving assembly further comprises a bearing base engaged with the transmission shaft and the driving gear coupled with the transmission shaft for driving the plurality of drills to rotate.

5. The drilling device of claim 4, wherein the bearing base is an annular sleeve body having a plurality of fastening holes for a plurality of screws to pass therethrough, thereby fastening the bearing base on the base.

6. The drilling device of claim 1, wherein a bearing base is disposed between the first coupling gear and the second coupling gear.

7. The drilling device of claim 6, wherein a bearing is disposed at the two opposite ends of the rotating shaft, and the second coupling gear causes portions of the drills to rotate.

8. The drilling device of claim 1, wherein each of the plurality of idler gears is engaged between two of the plurality of drills.

9. The drilling device of claim 1, wherein each of the drill bodies is a drill structure configured with a main shaft, a chuck engaged with one end of the main shaft, the action gear disposed to the other end of the main shaft, and a plurality of bearings and an oil seal disposed on the main shaft, and wherein the drill is securely connected to the chuck, and the plurality of bearings and the oil seal are positioned between the chuck and the action gear.

10. The drilling device of claim 9, wherein the drill is securely connected to an end of the chuck, and the action gear is disposed on the other end of the chuck to allow the action gear to rotate the chuck and thereby rotate the drill.

11. The drilling device of claim 1, wherein each of the drill bodies is configured with a main shaft and the action gear is disposed on the main shaft, and wherein when the second coupling gears of the coupling portions couple portions of the action gears, the other action gears are coupled synchronously by the idler gears that are engaged with the action gears.

12. The drilling device of claim 1, wherein four first coupling gears are respectively engaged with the driving gear in the first layer plate, such that the driving gear rotates the four first coupling gears of the coupling portions synchronously.

13. The drilling device of claim 1, wherein the drill set comprises four coupling portions in the second layer plate with thirty-six action gears and the plurality of idler gears, and each of four second coupling gears is engaged with two action gears, respectively, in the second layer plate, such that when the four second coupling gears rotate eight action gears, twenty-eight action gears are rotated by the idler gears that are engaged with the thirty-six action gears to rotate the drills of thirty-six drill bodies synchronously.

* * * * *